(12) United States Patent
Way et al.

(10) Patent No.: US 11,251,971 B2
(45) Date of Patent: Feb. 15, 2022

(54) VEHICLE INTEGRATION PLATFORM (VIP) SECURITY

(71) Applicant: Uber Technologies, Inc., San Francisco, CA (US)

(72) Inventors: Matthew James Way, Pittsburgh, PA (US); David G. Butler, San Jose, CA (US); Roman Kuzmenko, San Jose, CA (US); Matthew Charles Ellis Wood, Pittsburg, PA (US); Andrii Iasynetskyi, Millbrae, CA (US); Mark Yen, San Francisco, CA (US); Meenakshi Vohra, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 231 days.

(21) Appl. No.: 16/454,700

(22) Filed: Jun. 27, 2019

(65) Prior Publication Data

US 2020/0244466 A1 Jul. 30, 2020

Related U.S. Application Data

(60) Provisional application No. 62/796,808, filed on Jan. 25, 2019.

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/64* (2013.01); *H04L 9/006* (2013.01); *H04L 9/0825* (2013.01); *H04W 4/40* (2018.02)

(58) Field of Classification Search
CPC ..... H04L 9/3247; H04L 9/006; H04L 9/0825; H04W 4/40; G06F 21/64
See application file for complete search history.

(56) References Cited

U.S. PATENT DOCUMENTS

| 10,650,621 B1* | 5/2020 | King ...................... H04L 67/10 |
| 2005/0138384 A1* | 6/2005 | Brickell .................. G06F 21/57 |
| | | 713/182 |

(Continued)

FOREIGN PATENT DOCUMENTS

KR          101837338          3/2018

OTHER PUBLICATIONS

International Search Report and Written Opinion for PCT/US2020/013813, dated May 4, 2020, 12 pages.

(Continued)

*Primary Examiner* — Sher A Khan
(74) *Attorney, Agent, or Firm* — Schwegman Lundberg & Woessner, P.A.

(57) ABSTRACT

The present disclosure is directed to systems and methods associated with a communication infrastructure. The communication infrastructure includes a vehicle integration platform that includes a plurality of application programming interfaces configured to facilitate message communication among clients. The communication infrastructure includes a registration authority system configured to receive certificate signing requests from the clients and to generate client-specific credentials for establishing a predetermined time period of ability for client authentication within the vehicle integration platform. The communication infrastructure includes a certificate authority system configured to normalize requests received from the clients via the registration authority system such that the client-specific credentials are established according to an approved hierarchy of licensing certificates. The communication infrastructure (Continued)

includes a security library accessible by each of the clients and by components of the vehicle integration platform. The security library is configured to provide implementation logic for signing messages and implementation logic for validating messages.

12 Claims, 11 Drawing Sheets

(51) Int. Cl.
*H04W 4/40* (2018.01)
*G06F 21/64* (2013.01)
*H04L 9/00* (2022.01)
*H04L 9/08* (2006.01)

(56) References Cited

U.S. PATENT DOCUMENTS

| | | | |
|---|---|---|---|
| 2008/0034393 A1* | 2/2008 | Crayford | H04N 21/6125 725/87 |
| 2010/0131642 A1* | 5/2010 | Chalikouras | G06Q 30/0241 709/224 |
| 2011/0083011 A1* | 4/2011 | DiCrescenzo | H04L 9/0891 713/158 |
| 2014/0195808 A1* | 7/2014 | Lortz | H04L 63/0263 713/170 |
| 2016/0087804 A1 | 3/2016 | Park et al. | |
| 2016/0212129 A1* | 7/2016 | Johnston | G06F 21/73 |
| 2017/0012774 A1* | 1/2017 | Antoni | H04W 4/40 |
| 2017/0180989 A1* | 6/2017 | Etzel | H04L 9/088 |
| 2017/0236343 A1 | 8/2017 | Leboeuf et al. | |
| 2017/0374550 A1* | 12/2017 | Auer | H04W 12/041 |
| 2018/0026792 A1* | 1/2018 | Ben Hamida | H04L 63/123 713/176 |
| 2018/0174376 A1* | 6/2018 | Avary | G07C 5/008 |
| 2018/0191510 A1 | 7/2018 | Batten | |
| 2018/0374283 A1* | 12/2018 | Pickover | G07C 5/085 |
| 2019/0137595 A1* | 5/2019 | Choi | G01S 5/0263 |
| 2019/0140850 A1* | 5/2019 | Ambrosin | H04L 9/0872 |
| 2019/0362335 A1* | 11/2019 | Rosner | G06Q 20/102 |
| 2020/0213287 A1* | 7/2020 | Zhang | H04L 12/40 |
| 2020/0322135 A1* | 10/2020 | Kupwade Patil | H04L 9/085 |

OTHER PUBLICATIONS

Rajput et al., "CACPPA: A Cloud-Assisted Conditional Privacy Preserving Authentication Protocol for VANET", International Symposium on Cluster, Cloud and Grid Computing, 2016, 10 pages.

* cited by examiner

VEHICLE INTEGRATION PLATFORM (VIP) SECURITY

RELATED APPLICATIONS

The present disclosure claims priority to and the benefit of U.S. Provisional Patent App. No. 62/796,808 filed Jan. 25, 2019, which is hereby incorporated by reference herein in its entirety.

FIELD

The present disclosure relates generally to autonomous vehicles. More particularly, the present disclosure relates to a secure communication infrastructure associated with a vehicle integration platform for autonomous vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more computing devices. The computing system is configured to implement a communication infrastructure. The communication infrastructure includes a vehicle integration platform comprising a plurality of application programming interfaces configured to facilitate message communication among clients. The communication infrastructure includes a registration authority system configured to receive certificate signing requests from the clients and to generate client-specific credentials for establishing a predetermined time period of ability for client authentication within the vehicle integration platform. The communication infrastructure includes a certificate authority system configured to process requests received from the clients via the registration authority system such that the client-specific credentials are established according to an approved hierarchy of licensing certificates. The communication infrastructure includes a security library accessible by each of the clients and by components of the vehicle integration platform, the security library configured to provide implementation logic for signing messages and implementation logic for validating messages sent throughout the vehicle integration platform.

Another example aspect of the present disclosure is directed to a computer-implemented method for facilitating secure communications between a client and a vehicle integration platform. The method includes generating, by a computing system comprising one or more computing devices, a certificate signing request. The method includes providing, by the computing system, the certificate signing request to a public key infrastructure (PKI) provider. The method includes receiving, by the computing system, time-limited client-specific credentials based on a licensing certificate from the PKI provider. The method includes accessing, by the computing system, a security library configured to provide implementation logic for signing messages and implementation logic for validating messages sent throughout the vehicle integration platform, wherein the vehicle integration platform is configured to provide an infrastructure for the client to communicate regarding a service coordinated by an entity hosting the vehicle integration platform. The method includes transmitting, by the computing system, a signed message that includes a signature generated in accordance with the implementation logic for signing messages and the time-limited client-specific credentials to the vehicle integration platform.

Another example aspect of the present disclosure is directed to one or more non-transitory computer-readable media that collectively store instructions that, when executed by one or more processors, cause the one or more processors to perform operations. The operations include receiving a certificate signing request from a client. The operations include determining a licensing certificate associated with the client. The operations include generating time-limited client-specific credentials based on the licensing certificate associated with the client. The operations include accessing a security library configured to provide implementation logic for signing messages and implementation logic for validating messages sent throughout a vehicle integration platform, wherein the vehicle integration platform is configured to provide an infrastructure for the client to communicate with an entity hosting the vehicle integration platform. The operations include signing a message from the client using a signature generated in accordance with the implementation logic for signing messages and the time-limited client-specific credentials based on the licensing certificate for the client.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
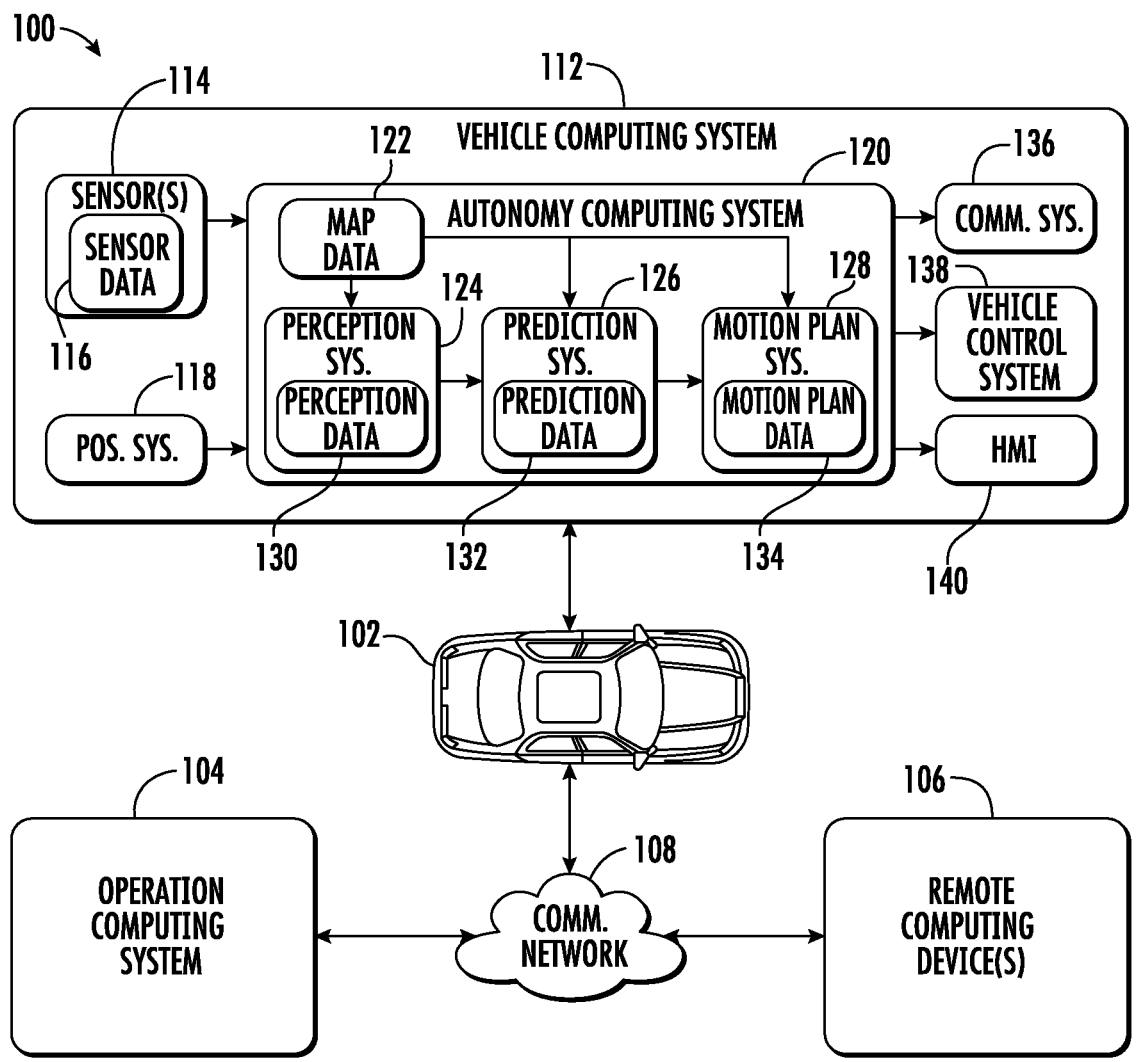
FIG. 1 depicts a block diagram of an example system for controlling the navigation of an autonomous vehicle according to example embodiments of the present disclosure.

Example aspects of the present disclosure are directed to providing improved secure communications among clients of a vehicle integration platform (VIP). The vehicle integration platform can include, for example, a plurality of application programming interfaces configured to facilitate message communication among clients. Clients of a vehicle integration platform can include autonomous vehicles associated with one or more respective vendors and one or more system clients associated with an entity (e.g., a service provider) configured to host the vehicle integration platform. The vehicle integration platform can include or access computing system components configured to provide a security framework. Such computing system components can include, for example, a public key infrastructure (PKI) provider comprising at least one registration authority (RA) and certificate authority (CA) configured to coordinate identity, authorization, and authentication of clients. Computing system components can additionally or alternatively include a security library (provided alone or as part of a broader client library) and associated message transport framework configured to provide implementation logic for message signing and validating that provides integrity and authenticity of communicated messages. Such features and others described in accordance with the disclosed technology can advantageously combine to provide a secure communication infrastructure that can assert and assure the integrity of messages and the identity of senders throughout the vehicle integration platform.

With more particular reference to a VIP and associated security framework, such infrastructure can establish the center of an ecosystem within which all clients and data including messages among clients are secure and trusted in order to maintain safety and system integrity. As such, the disclosed technology provides mechanisms, protocols, precedents, and other features by which the VIP and the communications ecosystem surrounding it are trustable and secure. This posture helps facilitate integration among all clients (e.g., autonomous vehicles) and any portion of the VIP, public or otherwise, and the continued integrity and safety of all participants and their data.

In accordance with an aspect of the disclosed technology, various security features can be provided by the computing system components providing a security framework. Such features can include, but are not limited to end-to-end trust, identity, transport authentication, transport authorization, message authentication (AuthN), message authorization (AuthZ), universal validation, and federation.

Regarding end-to-end trust, such feature can be provided at least in part by the disclosed PKI provider and message signature components. Message signatures can be a common proof of integrity, and indirectly, identity in a mixed-mode or untrusted infrastructure, and can form the underlying fabric of trust.

Regarding identity, such feature can be provided at least in part by the disclosed PKI provider, certificate authority, registration authorities, and message signature components. Identity can be normalized as VIP-signed certificates produced by various registration authorities.

Regarding transport authentication and transport authorization, such features can be provided at least in part by the disclosed PKI provider and security library. Transport connection endpoints may verify identity of peers whenever needed or possible. Transport connection endpoints can be configured to verify whether peer identity is authorized to communicate to it if transport layer security (TLS) is used.

Regarding message authentication and message authorization, such features can be provided at least in part by the disclosed security library and message signature components. Message authentication can be variously implemented via edges, frontends, and/or gateways of a vehicle integration platform. In some implementations, messages received at an edge node of the vehicle integration platform are received via an encrypted tunnel configured using transport layer security (TLS). Global frontends can be the first bastion of infra-bound authentication for clients such as autonomous vehicles. The VIP's gateway can be the last bastion of message authentication for messages bound to a client such as an autonomous vehicle. The VIP can not only assert that a given actor/client is who they claim to be, but also that they are permitted to perform the action being attempted.

Regarding universal validation, such feature can be provided at least in part by the PKI provider, message signature, security library, and client library components. Messages can be used in myriad and arbitrary contexts. There is no guarantee about the context of validation. Thus, messages can be configured to be universally validatable such that they can be proven to be authentic anywhere within the system.

Regarding federation, such feature can be provided at least in part by the VIP, registration authorities, security library, and client library components. By using the VIP as a bidirectional point of convergence, the system can assert overall authority over the communication and can be a consolidated arbiter of all data sent among clients, infrastructure components, and other entities.

With more particular reference to a PKI provider of the disclosed technology, such a system can in some implementations be hosted as part of a vehicle integration platform (e.g., hosted by the same entity configured to host the vehicle integration platform). In some implementations, the PKI provider can be accessed by the VIP but can be hosted by a third party entity that is different than an entity (e.g., a service provider) hosting the VIP.

In some implementations, the PKI provider can include one or more registration authority (RA) systems. Each registration authority system can be configured to implement onboarding/provisioning of new clients as well as certificate-based licensing. In according with onboarding/provisioning, the RA system can be configured to generate a license to operate certificate for each client that establishes a client-specific identity credential from a plurality of possible identity credentials. For example, in some implementations, a client can generate a provisioning process request and provide this request to the RA to initiate provisioning. In other implementations, a client can generate a message that is provided to the VIP, and upon receipt, the VIP provides the provisioning process request to the RA. In some implementations, the client-specific identity credential includes information configured to provide client-specific identification as well as information configured to provide vendor-specific identification. The generation and provision of a license to operate certificate by an RA system to a client can enable subsequent operational certificates to be created.

With more particular reference to the RA system(s), certificate-based licenses can be generated upon client request once a client is provisioned into the disclosed security system (e.g., via the disclosed client provisioning process). In general, client-specific credentials generated by the RA system(s) in the form of operational licenses can be short-lived certificates that, in some implementations, must be re-requested periodically. The operational certificates can sometimes contain embedded metadata such as a vehicle identifier generated by an entity hosting the VIP (e.g., a service provider). In some implementations, the credentials generated by the RA can be a requirement for message acceptance by the VIP. In some implementations, the client-specific credentials can be configured to expire after the predetermined time period such that each client must request renewed credentials from the registration authority system.

In accordance with another aspect of the disclosed technology, the one or more RA systems can sometimes be communicatively coupled with a certificate authority (CA) system. In general, the CA system can be configured to normalize requests received from the clients via the one or more RA systems such that the client-specific credentials are established according to an approved hierarchy of licensing certificates. In other words, the CA system can take vendor or compute cluster credentials as inputs and provide signed VIP certificates (e.g., licenses to operate) as outputs.

More particularly, the CA can provide a discrete root CA for all clients. Per-vendor intermediate CAs can be considered as children of the VIP CA in a hierarchy of licensing certificates. Additional entities within an example approved hierarchy of licensing certificates can include service provider certificates, client certificates, vendor certificates, vehicle certificates, session certificates, etc. This example hierarchy follows the natural taxonomy of autonomous vehicles. It allows for both cryptographically tracing ownership toward the top of the hierarchy (e.g., "which vendor does this vehicle belong to") as well as flexibly granular revocation of credentials. The RA and CA systems can thus work together to provide signed certificates to a client. In other words, an RA can take client/vendor information and compute cluster credentials as inputs, and provide signed VIP certificates (as defined within the CA system) and provide these credentials in the form of operational licenses as outputs.

With more particular reference to a security library within the security framework, the security library can be a self-contained library that is responsible for signing and validating messages based on configured credentials. A primary responsibility of the security library is to provide the fundamental implementation logic for signing and validating messages sent throughout the vehicle integration platform. In addition, the security library is configured to enable implementers to produce and handle messages securely and transparently, such that there is zero integration of workflow overhead in order to benefit from these features. In some implementations, the implementation logic for signing messages includes logic configured to sign messages in accordance with the client-specific credentials generated by the registration authority system. In some implementations, the implementation logic for signing messages comprises logic configured to generate a signed message including a plurality of message bytes and an appended plurality of signature bytes. In some implementations, the message signatures can be encoded in accordance with the implementation logic set forth by the security library using a protocol buffer.

In some implementations, each instance of the security library can retrieve and cache a signed configuration that defines how each type of message must be signed and verified. In some implementations, as an integral part of the verification process, a receiver (and all proxies/intermediates if applicable) verifies that the certificate/credentials used to sign the message matches at least one identity role that is authorized to issue messages of this type. Optionally, for some types of messages the identity of the message author will be verified to match certain field(s) within the message itself. This can help avoid potential complexity of propagating the authorization principal to the application protocol levels. In order for message-level authentication and authorization to be a sufficient access control measure, the security library can be configured to define catch-all rules (e.g., deny all) and to disable certain types of messages altogether (e.g., by requiring signature by a non-existent identity and/or explicitly disabling it).

In some implementations, the security library can be a standalone library. In other implementations, the security library can be a component of a larger client library. When a client library is employed, it can include middleware and/or other components for transparently managing the VIP's and clients' security concerns as they relate to message passing and authenticity/integrity of those messages. For example, outbound client middleware can automatically sign messages such that the VIP will correctly validate them, assuming that the client is properly configured with credentials. Inbound client middleware can automatically validate all received messages from the VIP to assert their authenticity and integrity.

Although in some instances communication with a VIP is established in one direction (e.g., client to VIP), messages can flow in both directions. As such, initial connection established with the VIP can be configured to handle any preliminary credential acquisition for stream-level authentication, and all messages sent on a stream can also be signed for message-level authentication and authorization. For instance, each communications layer can be unwrapped and validated as communication moves through the VIP infrastructure. For example, the communication infrastructure can include a message transport framework within the vehicle integration platform that is configured to propagate messages that are validated according to the implementation logic for validating messages and for dropping messages that are not validated. The message transport framework can be configured to generate a log of any message that is not validated and dropped by the message transport framework.

With more particular reference to the VIP, such component can facilitate secure, bidirectional communications between autonomous vehicles associated with a plurality of entities and a provider infrastructure such as, for example, a service provider's operations system (e.g., including a data center). To do so, the provider infrastructure can include a platform comprising one or more application programming interfaces (APIs) that are configured to allow autonomous vehicles associated with one or more entities and one or more provider infrastructure endpoints (e.g., system clients, etc.) to efficiently communicate.

In particular, the systems and methods of the present disclosure can provide one or more platforms to facilitate and manage communications between autonomous vehicles associated with a plurality of entities and one or more backend systems of a service entity. For example, a service provider infrastructure can include a "public" platform and a "private" platform which can facilitate communication between autonomous vehicles and one or more service provider infrastructure endpoints to provide for facilitating services provided by the autonomous vehicles. As a further example, the public platform associated with the service provider infrastructure can facilitate communication between the service provider infrastructure and autonomous vehicles associated with the service provider, as well as between the service provider infrastructure and one or more other entities (e.g., third-party entities (other than the service provider) managing autonomous vehicle fleets, etc.). The public platform can allow for services-related communication (e.g., trip services, routing services, etc.) between the service provider infrastructure and the autonomous vehicles and/or other entity system(s) (e.g., third-party entity systems managing autonomous vehicle fleets). Additionally, the private platform associated with the service provider infrastructure can facilitate communication between the service provider infrastructure and autonomous vehicles associated with the service provider. The private platform can allow for communication associated with the service provider autonomous vehicle-specific services (proprietary/internal services) in the service provider infrastructure (e.g., fleet management, remote autonomy assistance, etc.) between the service provider infrastructure and the autonomous vehicles of the service provider.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

The autonomous vehicles utilized by the entity to provide the vehicle service can be associated with a fleet of the entity or a third party. For example, the entity (e.g., the service provider) may own, lease, etc. a fleet of autonomous vehicles that can be managed by the entity (e.g., the system clients) to provide one or more vehicle services. An autonomous vehicle utilized to provide the vehicle service(s) can be included in this fleet of the entity. In some implementations, an autonomous vehicle can be associated with a third party such as, for example, an individual, an original equipment manufacturer (OEM), or another entity. Even though such an autonomous vehicle may not be included in the fleet of autonomous vehicles of the entity, the platforms of the present disclosure can allow the autonomous vehicle to still be utilized to provide the vehicles services offered by the entity, access its system clients, etc.

According to an aspect of the present disclosure, a provider entity infrastructure can include a public platform and a private platform to facilitate services between the provider entity infrastructure and autonomous vehicles associated with one or more entities (e.g., associated with the provider, associated with third party vendors, etc.). The public platform can facilitate access to provider services by autonomous vehicles associated with the provider and by autonomous vehicles associated with one or more third party vendors. The public platform can provide access to provider services such as trip assignment services, routing services, supply positioning services, payment services and/or the like. The private platform can provide access to provider services that are specific to the provider autonomous vehicle fleet such as fleet management services, autonomy assistance services, and/or the like. Both the public platform and the private platform each include a Gateway API to facilitate communication from the autonomous vehicles to the provider backend infrastructure services (e.g., backend system clients, etc.) and a Vehicle API to facilitate communication from the provider backend infrastructure services to the autonomous vehicles. Each of the platform's APIs can have separate responsibilities, monitoring, alerting, tracing, service level agreements (SLAs), and/or the like.

For example, the public platform Gateway API can abstract the provider infrastructure from the provider autonomous vehicles and third party vendor autonomous vehicles and facilitate requests from both the provider autonomous vehicles and third party vendor autonomous vehicles to communicate with the provider backend infrastructure. The public platform Vehicle API can abstract the provider autonomous vehicles and third party vendor autonomous vehicles from the provider infrastructure and facilitate requests from the provider infrastructure backend services to communicate with both the provider autonomous vehicles and third party vendor autonomous vehicles. The private Gateway API can abstract the provider infrastructure from the provider autonomous vehicles and facilitate requests from the provider autonomous vehicles to communicate with the provider backend infrastructure. The private platform Vehicle API can abstract the provider autonomous vehicles from the provider infrastructure and facilitate requests from the provider infrastructure backend services to communicate with the provider autonomous vehicles.

More particularly, the platforms can be logically consolidated points of ingress and egress of all communications from and/or to the autonomous vehicles (and/or third party vendor systems) and a service provider infrastructure. Moreover, the platforms can be logical constructs that contain all vehicle and/or service facing interfaces. For example, the platform can include a plurality of backend interfaces. Each backend interface can be associated with at least one system client. A system client can be the hardware and/or software implemented on a computing system (e.g., of the service provider) that is remote from the autonomous vehicle and that provides a particular back-end service to an autonomous vehicle (e.g., scheduling of vehicle service assignments, routing services, etc.). A backend interface can be the interface (e.g., a normalized interface) that allows one application and/or system (e.g., of the autonomous vehicle) to provide data to and/or obtain data from another application and/or system (e.g., a system client). Each backend interface can have one or more functions that are associated with the particular backend interface. The autonomous vehicle can provide a communication to the platform to call a function of a backend interface. In this way, the backend interfaces can be an external facing edge of the service provider infrastructure that is responsible for providing a secure tunnel for a vehicle and/or other system to communicate with a particular system client so that the vehicle and/or other system can utilize the backend service associated with that system client, and vice versa.

The provider entity infrastructure can include an API proxy to act as a central gateway to the public platform as well as provide an API management platform to provide security, reliability, scalability, and abstraction for the backend services. For example, in some implementations, the API proxy can provide authentication and security (e.g., access control), throttling and/or rate limiting, caching, API management tools, schema validation, analytics, development tools, standardized logon and metrics, and/or the like.

In some implementations, the platforms can provide for chain-based certificates to provide security, whereby certificates are hierarchical and traceable. For example, chain-based certificates provide for certificate chaining to establish hierarchical chains of trust that extend to each vendor and to each of the vendor's autonomous vehicles. The chain-based model can allow for revoking a certificate for a single autonomous vehicle and for revoking a certificate for the entire vendor fleet.

The systems and methods described herein provide a number of technical effects and benefits. For instance, the systems and methods can provide end-to-end trust for all actors and communication. Communications can support transitive trust in a mixed-mode ecosystem, such that they are not forced to solely rely on the integrity of any intermediate traffic planes. This advantage can be achieved at least in part using the disclosed features associated with a chained certificate-based point-to-point communication model and implementation of messages as fundamental units of information.

The systems and methods described herein provide additional technical effects and benefits including an ability to identify, authenticate, and authorize all actors and their communicated messages. All actors' connections, including forwarded logical constructs like gRPC streams, can contain sufficient information in order for all termination points within a message transport framework associated with the VIP to cryptographically verify the identity and authenticity of those connections. All connections and messages can contain sufficient in-band information such that their intent may be properly authorized relative to the sender's identity and subject of the communication. All messages sent between by an actor contain sufficient in-band information such that those messages may be arbitrarily proven to have integrity and a valid sending identity. All actors, both vehicles and infrastructure services, can be able to mutually verify identities between themselves and other actors to which they connect (e.g., P2P).

The systems and methods described herein provide additional technical effects and benefits including an ability to verify all communicated messages both in transit and at rest. The systems in the VIP ecosystem can be considered disparate and distributed by design. Additionally, there is no guarantee as to where or when a message will be used because the system is streaming-based and broadcast-based. As such, messages and their cryptographic metadata is advantageously self-sufficient in order to be arbitrarily verified. By using a model that utilizes messages as fundamental units of information, all actors can both produce metadata for and verify the metadata of messages as it relates to sender identity and message integrity.

The systems and methods described herein provide additional technical effects and benefits including an ability to provide communication-centric security that is federated, ubiquitous, and consistent. There can be one unifying security strategy for all actors, internal or otherwise. The inputs to systems adhering to this strategy may be disparate, for example, discrete, vendor-specific and authentication-specific RAs. However, the outputs and the means through which those outputs are used can be uniform. The VIP is intrinsically a federating entity. It can remain the nexus through which this communication occurs in order to provide a single, consistent point of convergence for traffic among clients (e.g., autonomous vehicles and a service provider). In addition, other parties can use the same security/business implementations that the platform itself uses.

The systems and methods of the present disclosure can provide an improvement to vehicle computing technology, such as autonomous vehicle computing technology and the remote computing systems associated therewith. For instance, the platforms, application programming interfaces, systems, and methods of the present disclosure provide a more secure and computationally efficient approach to communicating data to and/or from autonomous vehicles and computing systems remote from the autonomous vehicles. For example, a computing system (e.g., of an autonomous vehicle) can generate a certificate signing request that can then be provided to a PKI provider. The computing system can then receive time-limited client-specific credentials based on a licensing certificate from the PKI provider. The computing system can further access a security library configured to provide implementation logic for signing messages and implementation logic for validating messages sent throughout a vehicle integration platform, wherein the vehicle integration platform is configured to provide an infrastructure for the client to communicate regarding a service coordinated by an entity hosting the vehicle integration platform. The computing system can transmit a signed message that includes a signature generated in accordance with the implementation logic for signing messages and the time-limited client-specific credentials to the vehicle integration platform.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
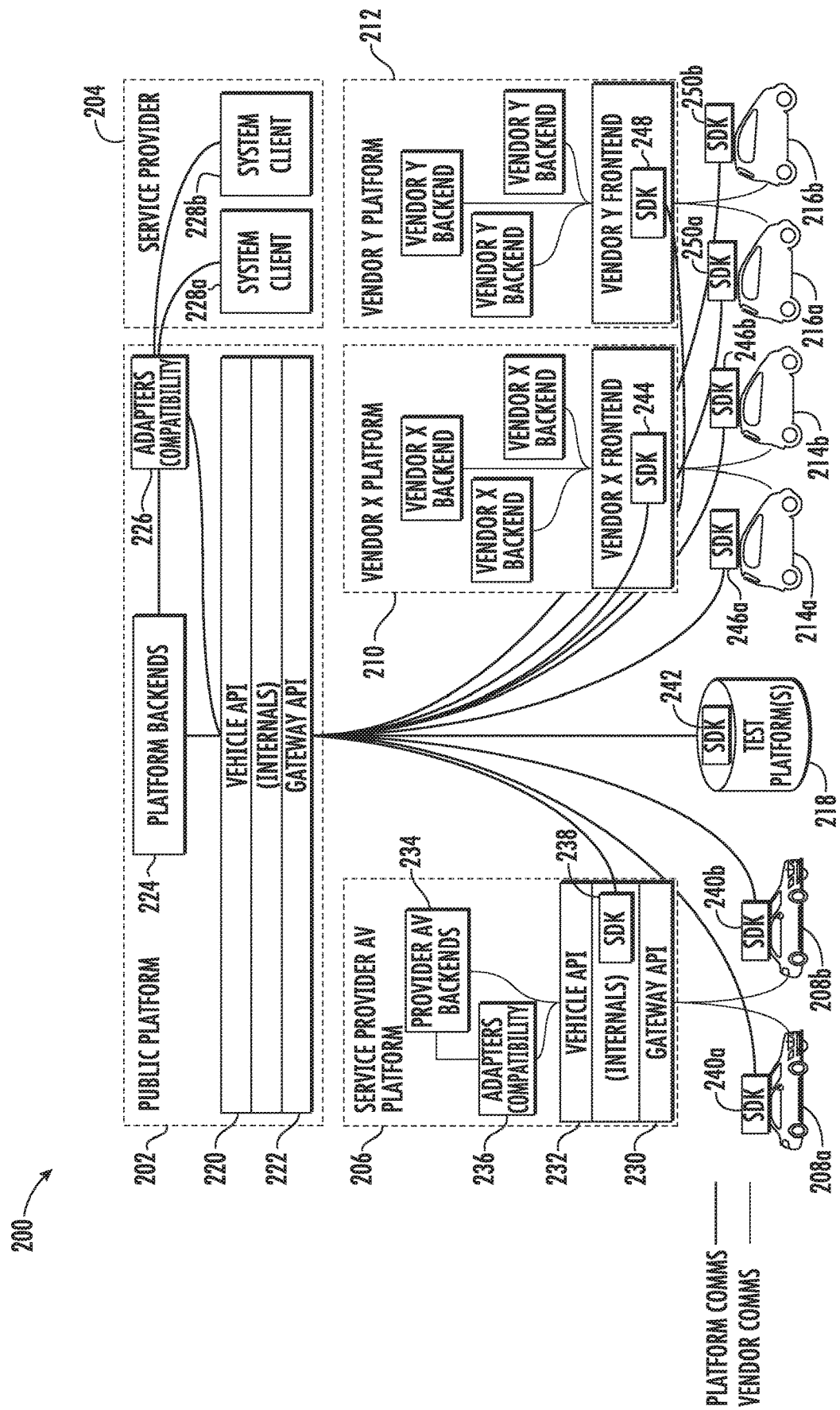
FIG. 2 depicts an example infrastructure system according to example embodiments of the present disclosure.

FIG. 2 depicts an example service infrastructure 200 according to example embodiments of the present disclosure. As illustrated in FIG. 2, an example service infrastructure 200, according to example embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208a and 208b, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214a, 214b, 216a, and 216b. In some implementations, the VIP component described herein can include one or more of the platforms and related components illustrated in the service infrastructure 200 of FIG. 2.

As described herein, a service infrastructure 200 can include a public platform 202 to facilitate vehicle services (e.g., provided via one or more system clients (228a, 228b) associated with a service provider operations computing system) between the service provider infrastructure system 204 (e.g., operations computing system, etc.) and vehicles associated with one or more entities (e.g., associated with the service provider (208a, 208b), associated with third-party entities (214a, 214b, 216a, 216b), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service provider infrastructure services (e.g., system clients 228a, 228b, etc.) and a vehicle API (e.g., vehicle API 220) to facilitate communication from the service provider infrastructure services (e.g., system clients 228a, 228b, etc.) to the autonomous vehicles (e.g., 208a, 208b, 214a, 214b, 216a, 216b).

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service provider) that is remote from the autonomous vehicle and that provides a particular back-end service to an autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. An autonomous vehicle can provide a communication to the public platform 202 to call a function of a backend interface. In this way, the backend interfaces can be an external facing edge of the service provider infrastructure system 204 that is responsible for providing a secure tunnel for a vehicle and/or other system to communicate with a particular service provider system client (e.g., 228a, 228b, etc.) so that the vehicle and/or other system can utilize the backend service associated with that particular service provider system client (e.g., 228a, 228b, etc.), and vice versa.

In some embodiments, the public platform 202 can include one or more adapters 226, for example, to provide compatibility between one or more backend interfaces 224 and one or more service provider system clients (e.g., 228a, 228b, etc.). In some embodiments, the adapter(s) 226 can provide upstream and/or downstream separation between the service provider operations computing system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service provider operations computing system) between the service provider infrastructure system 204 (e.g., operations computing system, etc.) and autonomous vehicles associated with the service provider (e.g., autonomous vehicles 208a, 208b). For example, in some embodiments, the private platform 206 can provide access to service provider services that are specific to the service provider autonomous vehicle fleet (e.g., vehicles 208a and 208b) such as fleet management services, autonomy assistance services, and/or the like.

The private platform 206 can include a gateway API (e.g., gateway API 230) to facilitate communication from the autonomous vehicles 208a, 208b to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214a, 214, 216a, and 216b. The third-party entity platforms 210, 212 can be distinct and remote from the service provide infrastructure and provide for management of vehicles associated with a third-party entity fleet, such as third-party entity (e.g., Vendor X) autonomous vehicles 214a, 214b and third-party entity (e.g., Vendor Y) autonomous vehicles 216a, 216b. The third-party entity (e.g., Vendor X) platform 210 and third-party entity (e.g., Vendor Y) platform 212, and/or third-party entity (e.g., Vendor X) autonomous vehicles 214a, 214b and third-party entity (e.g., Vendor Y) autonomous vehicles 216a, 216b can communicate with the service provider operations computing system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to which to provide access.

Figure 3:
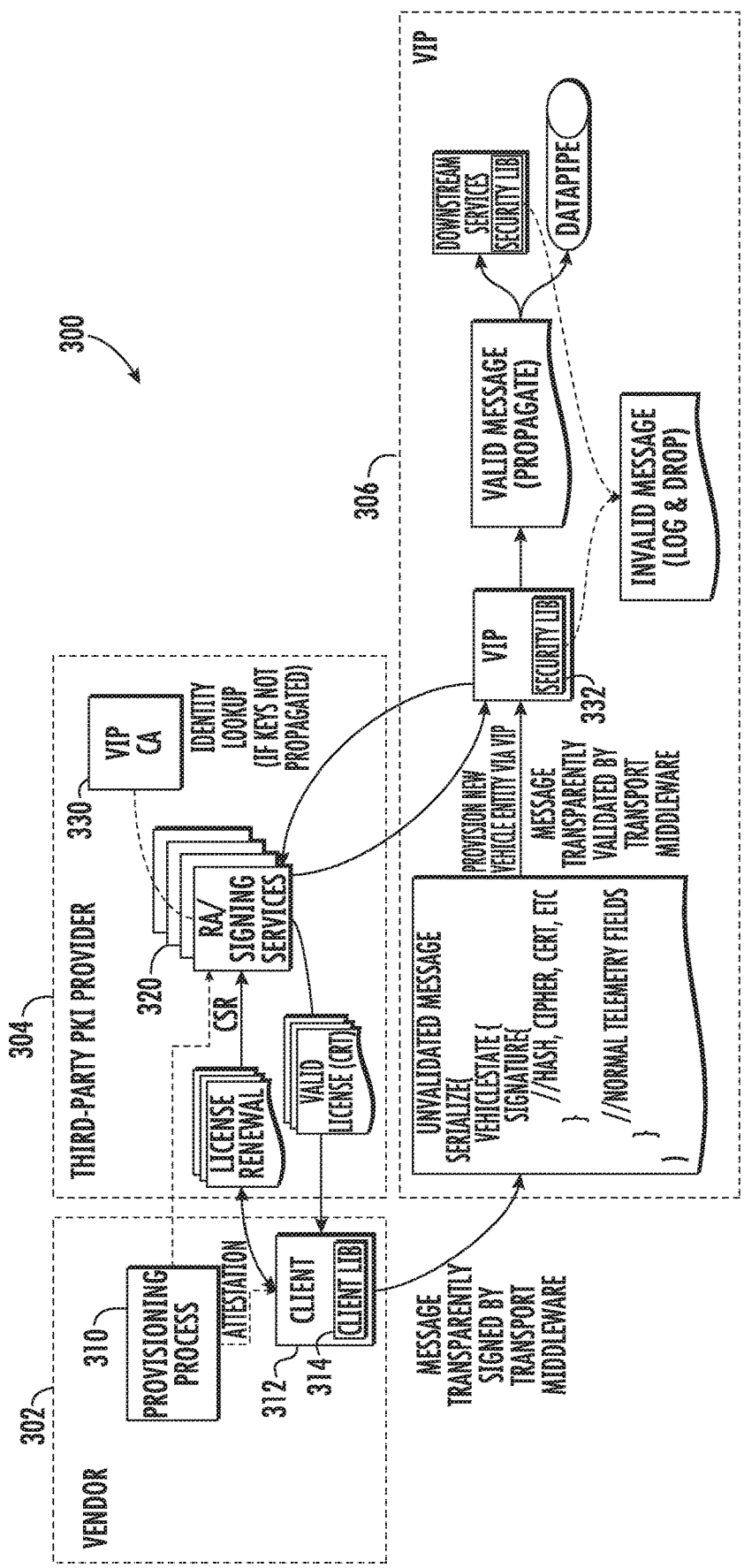
FIG. 3 depicts a block diagram of an example security implementation according to example embodiments of the present disclosure.

FIG. 3 depicts a block diagram of an example security implementation 300 according to example embodiments of the present disclosure. Security implementation 300 generally depicts interaction among a plurality of entities, including a vendor 302, PKI provider 304, and VIP 306. The illustrated security implementation 300 is PKI-based, supports strong, rotating identity, and supports vendor-specific licensing (e.g., in an abstracted fashion).

The VIP 306 can be a central component of the security implementation 300. In addition to brokering traffic, the VIP 306 can assert the authenticity and integrity of all messages that it handles. The VIP 306 can also assert that every actor is only invoking methods/functionality that they are permitted to. The VIP 306 can interact with the PKI provider 304 and the vendor 302 to provision and authenticate a client 312 of the vendor 302.

In particular, as illustrated, the vendor 302 can include or perform a provisioning process 312. The provisioning process 312 can communicate with a registration authority (RA) 320 of the PKI provider 304, which can in turn interact with the VIP certificate authority (CA) 330 to coordinate identity, authorization, and authentication of the client 312 of the vendor 302.

For example, at a first instance of registering the client 312, the provisioning process 310 can coordinate with the RA 320 on behalf of the client 312, while in subsequent instances the client 312 can directly interact with the RA 320 to perform license renewal and receive new valid (and potentially time-limited) licenses. The RA 320 can communicate with the VIP 306 to provision a new vehicle entity via the VIP 306.

The VIP CA 330 can provide the root CA for all clients. Per-vendor intermediate Cas can be children of the VIP CA (see, e.g., FIG. 4). The VIP CA 330 can be rooted at an offline CA and can exist to create a discrete tree for VIP platform certificates (e.g., licenses to operate for clients) separate from other certificates within the infrastructure. The RA 320 can take vendor or compute cluster credentials as inputs and provide signed certificates (licenses to operate) as outputs.

The client 312 can employ or leverage a client library 314 to send a message to the VIP 306. The client library 314 can be provided by the first-party that provides the VIP 306 or can be built according to an API specification. The client library 314 can standardize the integration of clients with the VIP 306.

The VIP 306 can employ or leverage a security library 332 to either validate or invalidate the message. The security library 332 can be a self-contained library that is responsible for signing and validating messages based on configured credentials. A validated message can be provided to one or more downstream services or other systems, databases, message brokers, etc. An invalid message can be logged and/or dropped. In some instances, the VIP 306 can perform an identity lookup with the RA 320 to validate the message from the client 312 (e.g., in instances in which the keys are not propagated with the message).

Although the PKI provider 304 is illustrated in FIG. 3 as being provided by a third-party, in other implementations the PKI provider 304 can be provided by the first-party (e.g., the same party that is providing the VIP 306).

Figure 4:
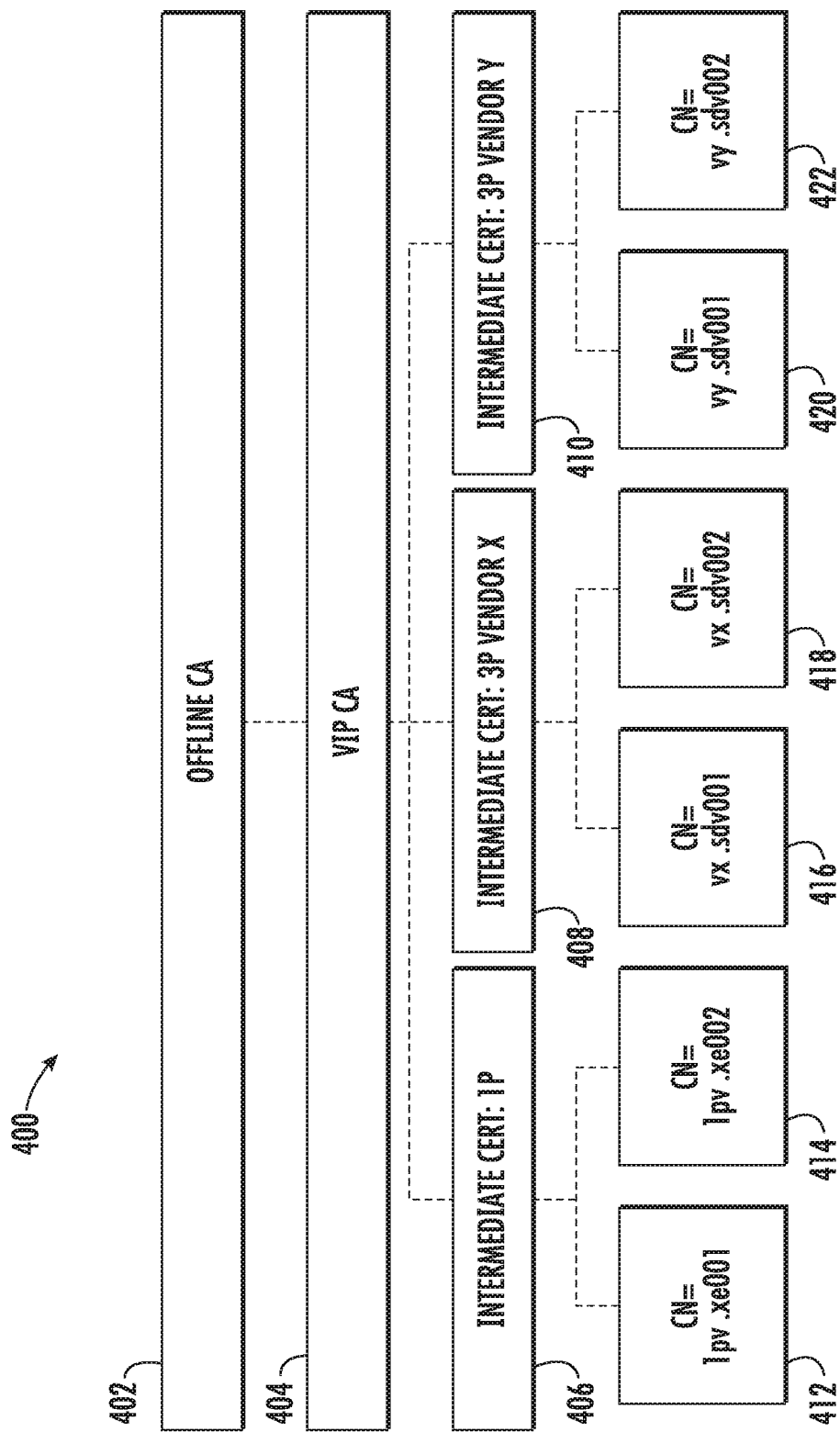
FIG. 4 depicts a block diagram of an example hierarchy of licensing certificates according to example embodiments of the present disclosure.

FIG. 4 depicts a block diagram of an example hierarchy 400 of licensing certificates according to example embodiments of the present disclosure. The example hierarchy 400 includes an offline certificate authority (CA) 402, a VIP CA 404, a number of intermediate certificates 406-410, and a number of client certificates 412-422.

The example intermediate certificates illustrated in FIG. 4 include an intermediate certificate 406 associated with the first-party entity and two intermediate certificates 408 and 410 respectively associated with two different third-party entities or vendors. In some implementations, the client certificates 412-422 are time-limited and may be referred to as licenses to operate. In some implementations, some or all of the client certificate 412-422 can correspond to one of a number of autonomous vehicles.

In particular, in some implementations, the hierarchy of the certificates can be as follows: First-Party (e.g., VIP)>Vendor>Client (e.g., vehicle)>Session. Such a hierarchy allows for both cryptographically tracing ownership toward the top of the hierarchy (e.g., "which vendor does this vehicle below to") as well as flexibly granular revocation of credentials.

Thus, in some implementations, credentials used with the VIP are not permanent, but instead must be periodically reacquired. Valid credentials can implicitly establish periods of authenticatability known as "sessions". Whether due to not holding credentials or receiving a corresponding response status, clients may be required to communicate with the appropriate Registration Authority (RA) in order to acquire new credentials, which can be valid for a limited time (after which, or shortly before, the caller must go through the same acquisition/renewal process again). In some implementations, the credentials returned by the RA are the only means by which a client can access the VIP. In some implementations, the credentials are normalized, are tied to the vendor under which the client is registered, and can be revoked at any time.

In some implementations, hierarchies of licensing certificates other than the example hierarchy illustrated in FIG. 4 can be used. For example, in some implementations, certain trusted third-parties can be enabled to have their own root of certificates other than the first-party offline CA.

Figure 5:
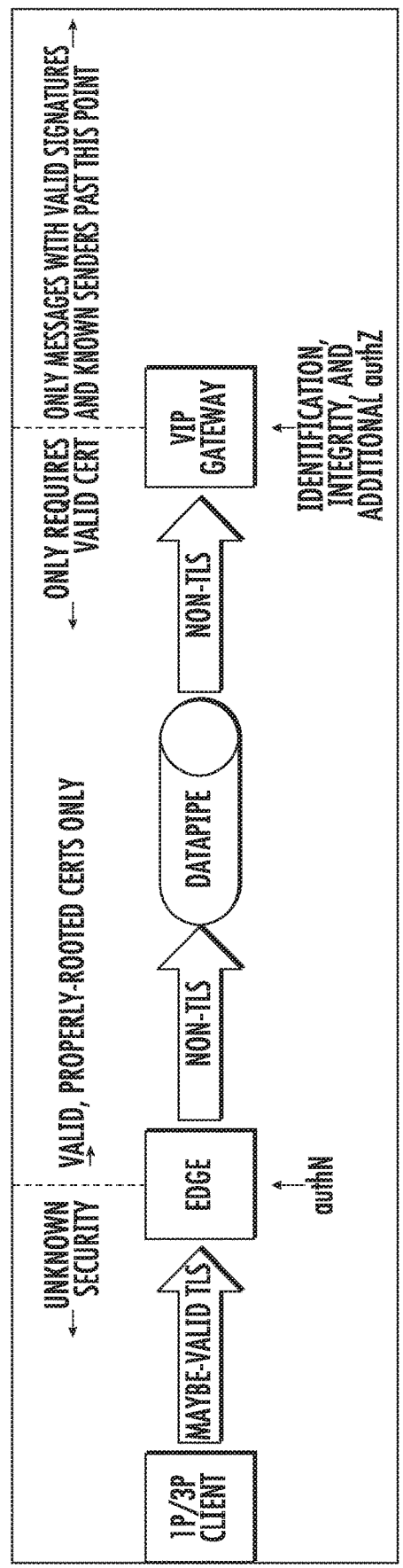
FIG. 5 depicts a block diagram of example message identity and authentication according to example embodiments of the present disclosure.

FIG. 5 depicts a block diagram of an example message identity and authentication process according to example embodiments of the present disclosure. In the illustrated process, communication with the VIP is established from a client via an edge device or connection. However, messages may flow in both directions. As such, the initial connection can be configured to handle any preliminary credential acquisition from stream-level authN (which can include unary requests), and all messages sent on a stream (or as part of a unary request) can be required to be signed for message-level authN and authZ. As illustrated in FIG. 5, each communication layer can be unwrapped and validated as communication moves through the infrastructure.

Figure 6:
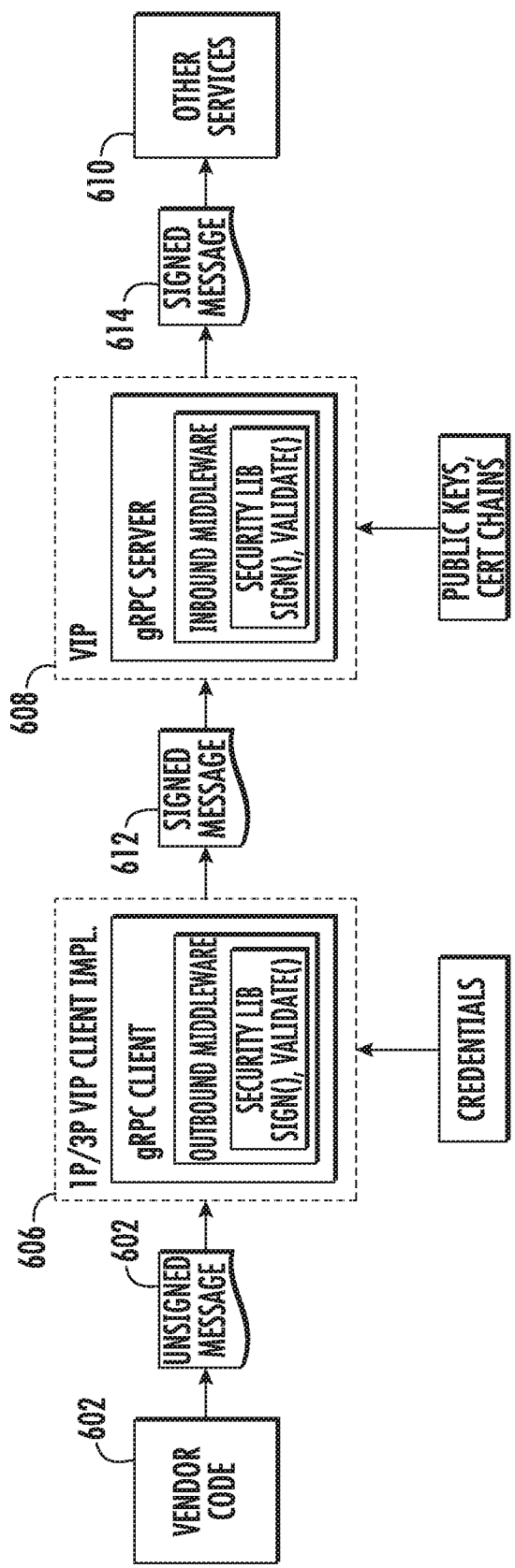
FIG. 6 depicts a block diagram of a first example message-level integrity implementation according to example embodiments of the present disclosure.

FIG. 6 depicts a block diagram of a first example message-level integrity implementation according to example embodiments of the present disclosure. In particular, in some implementations, given the ability to sign and validate message signatures, message-level trust is not present for communications (e.g., unsigned message 604) transmitted from the vendor 602 to the client VIP implementation 606 (e.g., which may take the form of or be included within an SDK). However, message-level trust may be established for communications (E.g., signed messages 612 and 614) at the VIP 608 and/or for other services 610 by virtue of signature validation.

Figure 7:
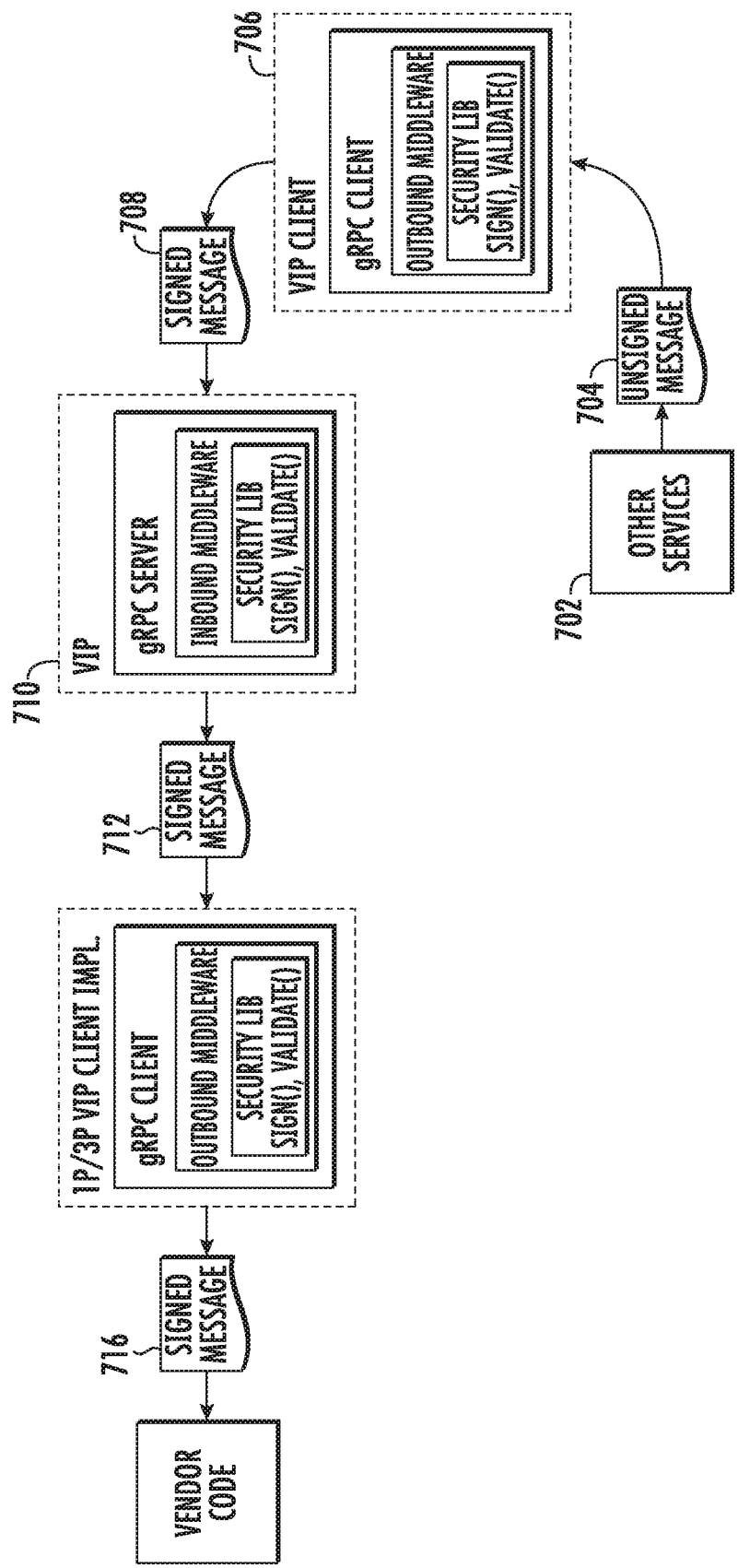
FIG. 7 depicts a block diagram of a second example message-level integrity implementation according to example embodiments of the present disclosure.

FIG. 7 depicts a block diagram of a second example message-level integrity implementation according to example embodiments of the present disclosure. In particular, FIG. 7 illustrates an inverse case to FIG. 6 in which trust is mirrored in the other direction. For example, as illustrated in FIG. 7, trust is not necessarily established for communications (e.g., unsigned message 704) between other services 702 and the VIP Client 706. However, trust can be established for other communications (e.g., messages 708, 712, 716) once the VIP 710 validates the signature associated with such communications.

Figure 8:
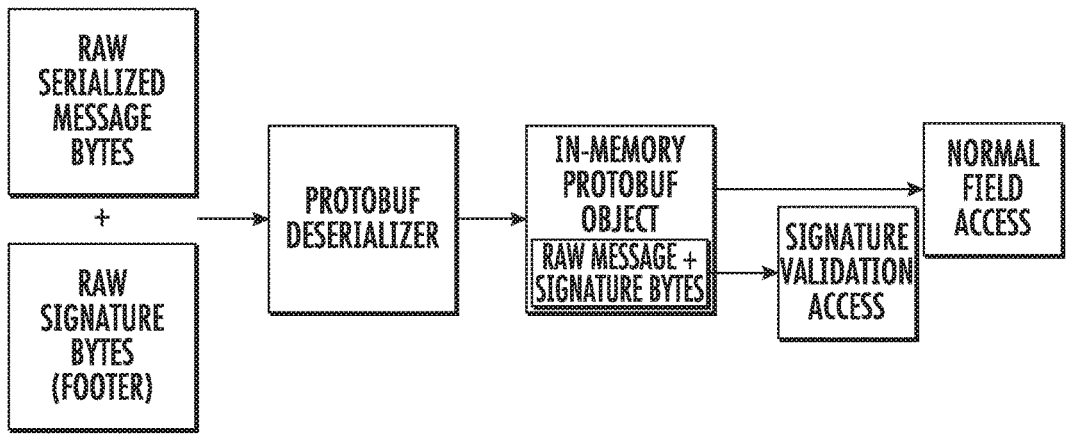
FIG. 8 depicts a block diagram of a first example message signing implementation according to example embodiments of the present disclosure.
Figure 9:
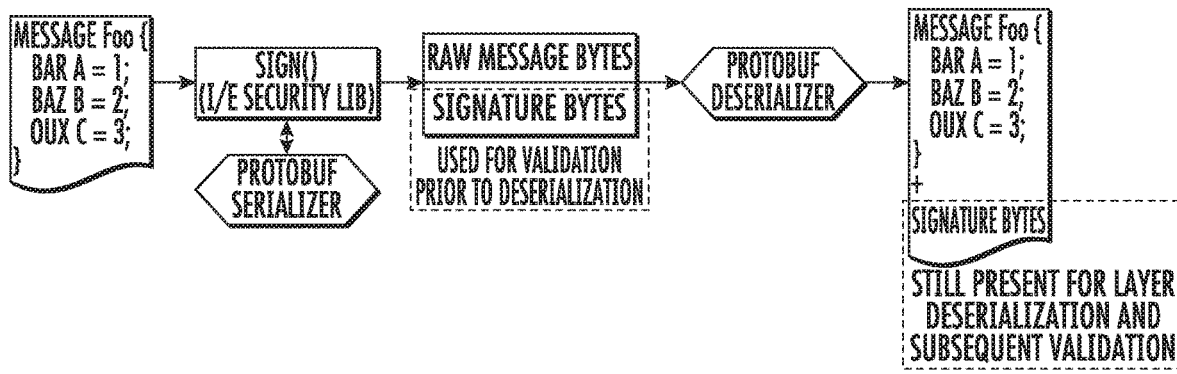
FIG. 9 depicts a block diagram of a second example message signing implementation according to example embodiments of the present disclosure.

FIG. 8 depicts a block diagram of a first example message signing implementation according to example embodiments of the present disclosure. FIG. 9 depicts a block diagram of a second example message signing implementation according to example embodiments of the present disclosure.

In particular, in some implementations, message signatures can be a cryptographic digest of the contents of a message, signed by the sender (which, in turn, can be required to be traceable back to an intermediate or root that the validator trusts).

Within the VIP, two example purposes of the signatures at a per-message level include: to prove the integrity of the message, and to prove that the message was sent by a known or trusted actor. In a broader scope (e.g., when distributed across the ecosystem) the signatures can be used to establish trust: whether services have mutual transport-level auth can be ignores, as signatures are either valid or not, and can be used to authenticate or apply access control lists.

Signatures can also provide the framework by which messages can be validated. Additionally, in some implementations, signatures can be transparent and unobtrusive. In effect, they can provide for a system of passive or natural validation, in which application or pipeline checkpoints may (or must) assert the validity of the signature's contents relative to a given message.

In some implementations, for example as illustrated in FIG. 8, signatures can be carried in a side-channel as extra data on the wire that can be discarded by the deserializer but could be read by the security library (e.g., via Protobuf's reflection and serialization APIs).

However, in other implementations, for example as illustrated in FIG. 9, signatures can be embedded as fields within relevant Protobuf messages that are to be signed, such that the message itself is sufficient to be validated at any point in time. In the implementation illustrated in FIG. 9, (de) serialization can add or preserve additional side-channel data that can be used to provide additional validation capability.

Figure 10:
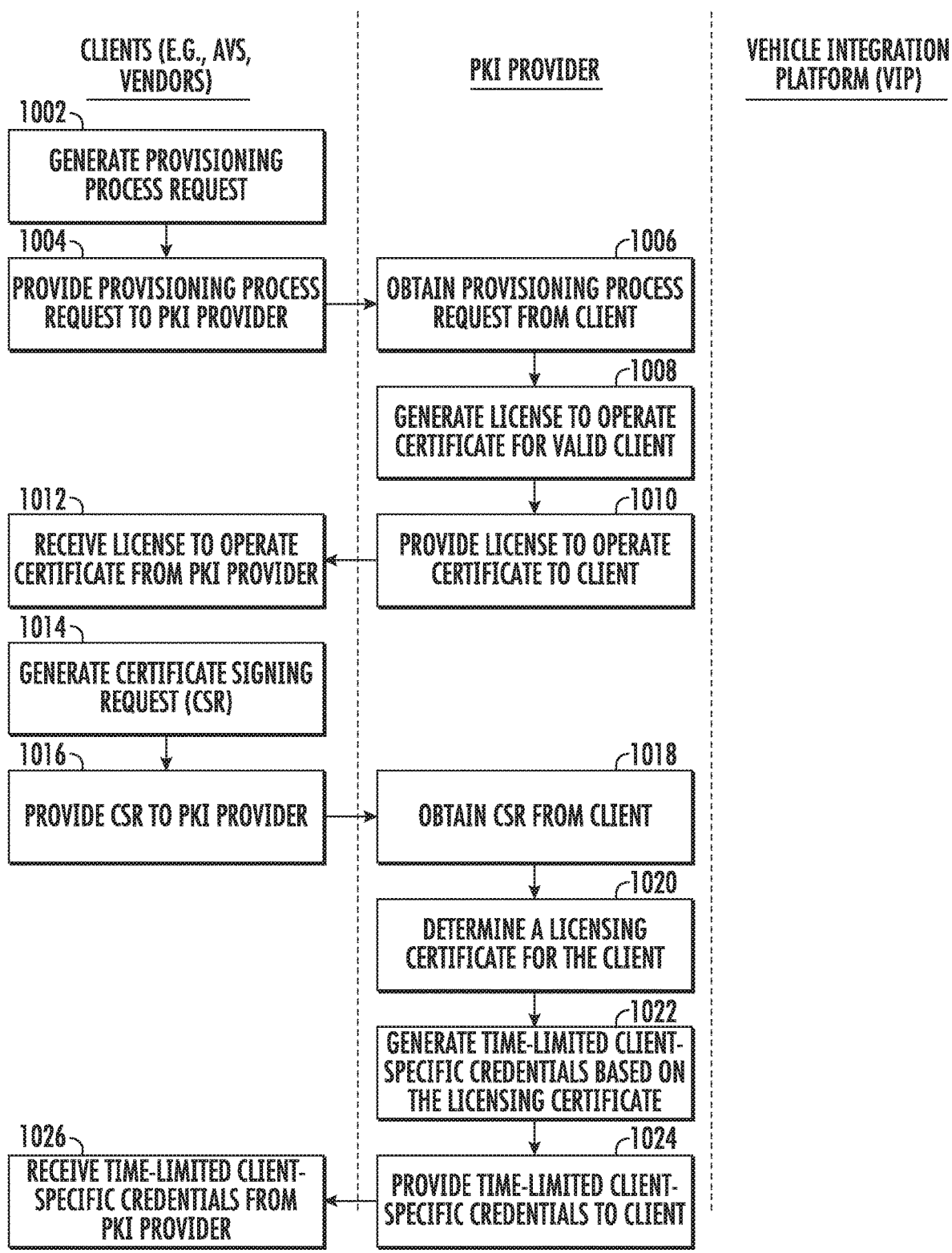
FIG. 10 depicts a first example flow chart of message communication among a client, PKI provider and vehicle integration platform according to example embodiments of the present disclosure.

FIG. 10 depicts a first example flow chart of message communication among a client, PKI provider and vehicle integration platform according to example embodiments of the present disclosure.

At 1002, a client generates a provisioning process request. At 1004, the client provides the provisioning process request to the PKI provider.

At 1006, the PKI provider obtains the provisioning request from the client. At 1008, the PKI provider generates a license to operate certification if the client is valid. At 1010, the PKI provider provides the license to operate certificate to the client.

At 1012, the client receives the license to operate certificate from the PKI provider. At 1041, the client generates a certificate signing request (CSR). At 1016, the client provides the CSR to the PKI provider.

At 1018, the PKI provider obtains the CSR from the client. At 1020, the PKI provider determines a licensing certificate for the client. At 1022 the PKI provider generates a time-limited client-specific credentials based on the licensing certificate.

At 1024, the PKI provider provides the time-limited client-specific credentials to the client. At 1026, the client receives the time-limited client-specific credentials from the PKI provider.

Figure 11:
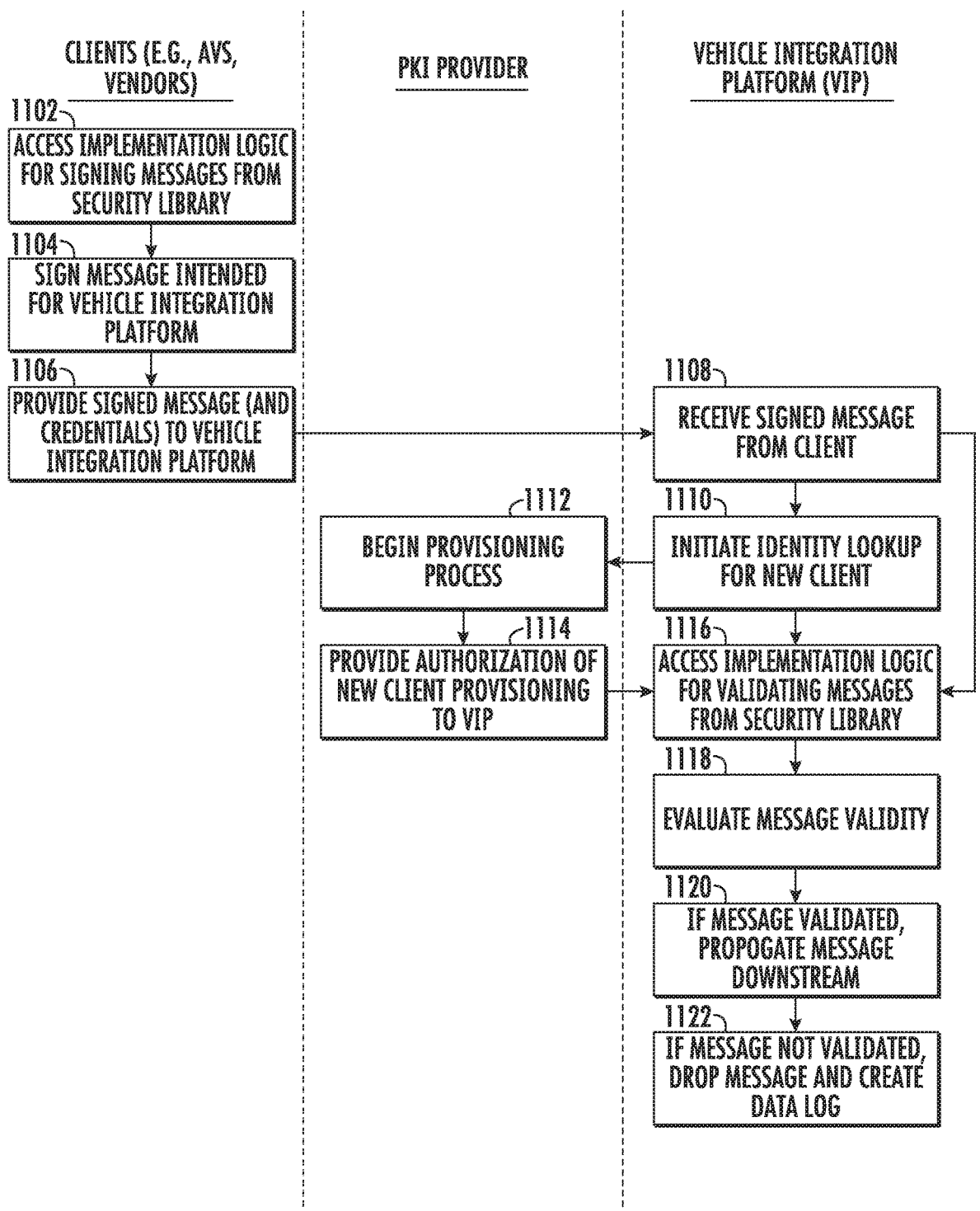
FIG. 11 depicts a second example flow chart of message communication among a client, PKI provider and vehicle integration platform according to example embodiments of the present disclosure.

FIG. 11 depicts a second example flow chart of message communication among a client, PKI provider and VIP according to example embodiments of the present disclosure.

At 1102, a client accesses implementation logic for signing messages from a security library. At 1104, the client signs the message intended for the VIP. At 1106, the client provides a signed message (and potentially credentials) to the VIP.

At 1104, the VIP receives the signed message from the client. If appropriate, the VIP can initiate an identity lookup for a new client at 1110. The PKI provider can begin the provisioning process at 1112. At 1114, the PKI provider provides authorization of new client provisioning the VIP. If new client provisioning is not needed, then the illustrated method can proceed directly from 1108 to 1116

At 1116, the VIP can access implementation logic for validating messages from the security library. At 1118, the VIP can evaluate the validity of the message. At 1120, if the message is validated, the VIP can propagate the message downstream. At 1122, if the message is not validated, the VIP can drop the message and create a data log.

Figure 12:
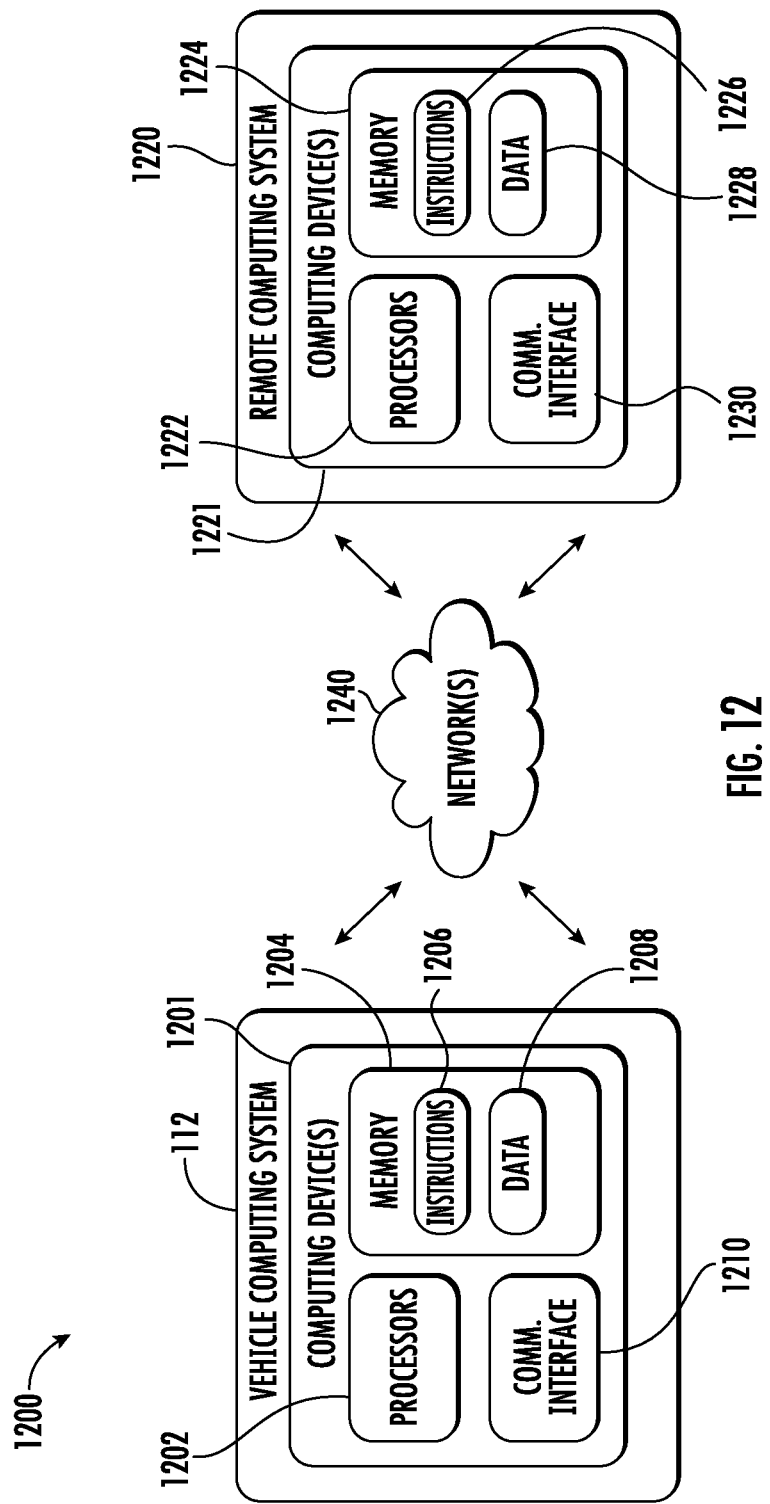
FIG. 12 depicts a block diagram of an example computing system according to example embodiments of the present disclosure.

FIG. 12 depicts a block diagram of an example computing system 1200 according to example embodiments of the present disclosure. The example system 1200 illustrated in FIG. 12 is provided as an example only. The components, systems, connections, and/or other aspects illustrated in FIG. 12 are optional and are provided as examples of what is possible, but not required, to implement the present disclosure. The example system 1200 can include the vehicle computing system 112 of the autonomous vehicle 102 and a remote computing system 1220 (e.g., operations computing system, other computing system, etc. that is remote from the vehicle 102) that can be communicatively coupled to one another over one or more network(s) 1240. The remote computing system 1220 can be and/or include the operations computing system 104 and/or remote computing system 106 of FIG. 1. The remote computing system 1220 can be associated with a central operations system and/or an entity associated with the vehicle 102 such as, for example, a vehicle owner, vehicle manager, fleet operator, service provider, etc. For instance, the remote computing system 1220 can be or otherwise include the remote computing system 104 described herein.

The computing device(s) 1201 of the vehicle computing system 112 can include processor(s) 1202 and at least one memory 1204. The one or more processors 1202 can be any suitable processing device (e.g., a processor core, a microprocessor, an ASIC, a FPGA, a controller, a microcontroller, etc.) and can be one processor or a plurality of processors that are operatively connected. The memory 1204 can include one or more non-transitory computer-readable storage media, such as RAM, ROM, EEPROM, EPROM, one or more memory devices, flash memory devices, magnetic disks, data registers, etc., and combinations thereof.

The memory 1204 can store information that can be accessed by the one or more processors 1202. For instance, the memory 1204 (e.g., one or more non-transitory computer-readable storage mediums, memory devices) can include computer-readable instructions 806 that can be executed by the one or more processors 1202. The instructions 1206 can be software written in any suitable programming language or can be implemented in hardware. Additionally, or alternatively, the instructions 1206 can be executed in logically and/or virtually separate threads on processor(s) 1202.

For example, the memory 1204 on-board the vehicle 102 can store instructions 1206 that when executed by the one or more processors 1202 cause the one or more processors 1202 (e.g., in the vehicle computing system 112) to perform operations such as any of the operations and functions of the computing device(s) 1201 and/or vehicle computing system 112, any of the operations and functions for which the vehicle computing system 112 is configured, and/or any other operations and functions described herein.

The memory 1204 can store data 1208 that can be obtained (e.g., received, accessed, written, manipulated, created, generated, etc.) and/or stored. The data 1208 can include, for instance, services data (e.g., trip data, route data, user data, etc.), sensor data, map data, perception data, prediction data, motion planning data, object states and/or state data, object motion trajectories, feedback data, fault data, log data, and/or other data/information as described herein. In some implementations, the computing device(s) 1201 can obtain data from one or more memories that are remote from the autonomous vehicle 102.

The computing device(s) 1201 can also include a communication interface 1210 used to communicate with one or more other system(s) (e.g., the remote computing system 1220). The communication interface 1210 can include any circuits, components, software, etc. for communicating via one or more networks (e.g., network(s) 1240). In some implementations, the communication interface 1210 can include, for example, one or more of a communications controller, receiver, transceiver, transmitter, port, conductors, software, and/or hardware for communicating data.

The remote computing system 1220 can include one or more computing device(s) 1221. The computing device(s) 1221 can include one or more processors 1222 and at least one memory 1224. The one or more processors 1222 can be any suitable processing device (e.g., a processor core, a microprocessor, an ASIC, a FPGA, a controller, a microcontroller, etc.) and can be one processor or a plurality of processors that are operatively connected. The memory 1224 can include one or more tangible, non-transitory computer-readable storage media, such as RAM, ROM, EEPROM, EPROM, one or more memory devices, flash memory devices, data registers, etc., and combinations thereof.

The memory 1224 can store information that can be accessed by the one or more processors 1222. For instance, the memory 1224 (e.g., one or more tangible, non-transitory computer-readable storage media, one or more memory devices, etc.) can include computer-readable instructions 1226 that can be executed by the one or more processors 1222. The instructions 1226 can be software written in any suitable programming language or can be implemented in hardware. Additionally, or alternatively, the instructions 1226 can be executed in logically and/or virtually separate threads on processor(s) 1222.

For example, the memory 1224 can store instructions 1226 that when executed by the one or more processors 1222 cause the one or more processors 1222 to perform operations such as any of the operations and functions of the operations computing system 104, the remote computing system 106, the remote computing system 1220 and/or computing device(s) 1221 or for which any of these computing systems are configured, as described herein, and/or any other operations and functions described herein.

The memory 1224 can store data 1228 that can be obtained and/or stored. The data 1228 can include, for instance, services data (e.g., trip data, route data, user data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, etc.), third-party entity data, inventory data, scheduling data, log data, attribute data, scenario data, training data, and/or other data/ information as described herein. In some implementations, the computing device(s) 1221 can obtain data from one or more memories that are remote from the remote computing system 1220.

The computing device(s) 1221 can also include a communication interface 1230 used to communicate with one or more other system(s) (e.g., the vehicle computing system 112, etc.). The communication interface 1230 can include any circuits, components, software, etc. for communicating via one or more networks (e.g., network(s) 1240). In some implementations, the communication interface 1230 can include, for example, one or more of a communications controller, receiver, transceiver, transmitter, port, conductors, software, and/or hardware for communicating data.

The network(s) 1240 can be any type of network or combination of networks that allows for communication between devices. In some embodiments, the network(s) 1240 can include one or more of a local area network, wide area network, the Internet, secure network, cellular network, mesh network, peer-to-peer communication link, and/or some combination thereof, and can include any number of wired or wireless links. Communication over the network(s) 1240 can be accomplished, for instance, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for facilitating secure communications between a client and a vehicle integration platform, the method comprising:
    generating, by a computing system comprising one or more computing devices, a certificate signing request;
    providing, by the computing system, the certificate signing request to a public key infrastructure (PKI) provider;
    receiving, by the computing system, time-limited client-specific credentials based on a licensing certificate from the PKI provider;
    accessing, by the computing system, a security library configured to provide implementation logic for signing messages and implementation logic for validating messages sent throughout the vehicle integration platform, wherein the security library retrieves and caches a signed configuration that defines how each type of message must be signed and verified, wherein the vehicle integration platform is configured to provide an infrastructure for the client to communicate regarding a service coordinated by an entity hosting the vehicle integration platform; and
    transmitting, by the computing system, a signed message that includes a signature generated in accordance with the implementation logic for signing messages and the time-limited client-specific credentials to the vehicle integration platform.

2. The computer-implemented method of claim 1, wherein the implementation logic for signing messages comprises logic configured to sign messages in accordance with the time-limited client-specific credentials received from the PKI provider.

3. The computer-implemented method of claim 1, comprising:
    generating, by the computing system, a provisioning process request;
    providing, by the computing system, the provisioning process request to the PKI provider; and
    receiving, by the computing system, a license to operate certificate from the PKI provider.

4. The computer-implemented method of claim 1, wherein the vehicle integration platform comprises a plurality of application programming interfaces configured to facilitate message communication among clients, the clients comprising a plurality of autonomous vehicles respectively associated with one or more vendors and one or more system clients associated with the entity.

5. The computer-implemented method of claim 1, wherein the time-limited client-specific credentials are configured to expire after a predetermined time period.

6. The computer-implemented method of claim 1, wherein the implementation logic for signing messages comprises logic configured to generate a signed message including a plurality of message bytes and an appended plurality of signature bytes.

7. One or more non-transitory computer-readable media that collectively store instructions that, when executed by one or more processors, cause the one or more processors to perform operations, the one or more non-transitory computer-readable media associated with a public key infrastructure (PKI) provider, the operations comprising:
    receiving a certificate signing request from a client;
    determining a licensing certificate associated with the client;
    generating time-limited client-specific credentials based on the licensing certificate associated with the client;
    accessing a security library configured to provide implementation logic for signing messages and implementation logic for validating messages sent throughout a vehicle integration platform, wherein the security library retrieves and caches a signed configuration that defines how each type of message must be signed and verified, wherein the vehicle integration platform is configured to provide an infrastructure for the client to communicate with an entity hosting the vehicle integration platform; and
    signing a message from the client using a signature generated in accordance with the implementation logic for signing messages and the time-limited client-specific credentials based on the licensing certificate for the client.

8. The one or more non-transitory computer-readable media of claim 7, wherein the client comprises an autonomous vehicle associated with a respective vendor.

9. The one or more non-transitory computer-readable media of claim 7, wherein the client comprises a system client associated with the entity.

10. The one or more non-transitory computer-readable media of claim 7, the operations comprising:
   receiving a provisioning process request from the client;
   generating a license to operate certificate when an identity associated with the client is authenticated; and
   providing the license to operate certificate to the client.

11. The one or more non-transitory computer-readable media of claim 7, wherein the implementation logic for signing messages comprises logic configured to generate a signed message including a plurality of message bytes and an appended plurality of signature bytes.

12. The one or more non-transitory computer-readable media of claim 7, wherein the time-limited client-specific credentials are configured to expire after a predetermined time period such that renewed credentials are generated periodically upon request by the client.

\* \* \* \* \*